United States Patent Office 3,145,752
Patented Aug. 25, 1964

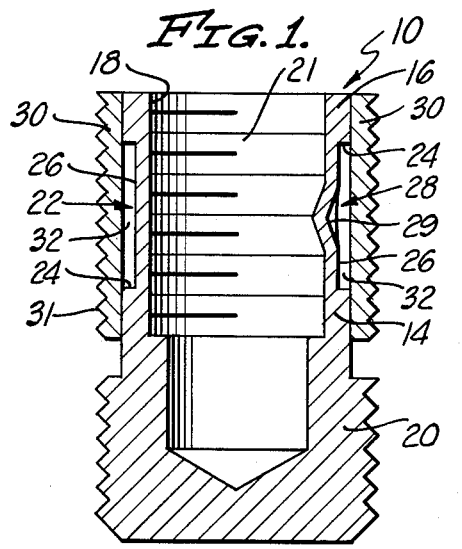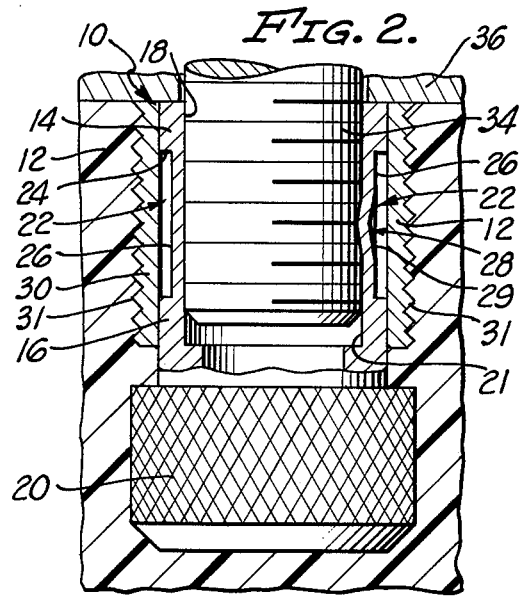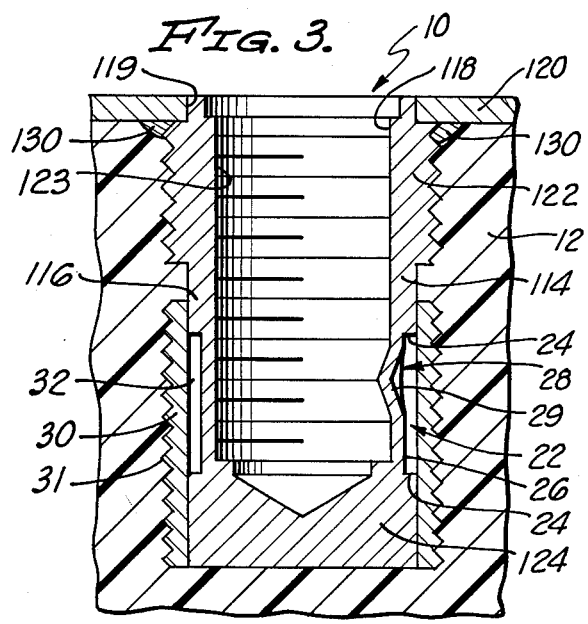

3,145,752
SELF-LOCKING INSERT HAVING A PROTECTIVE
COLLAR COVERING THE LOCKING MEANS
James N. Dupree, West Covina, Calif.
(1710 Potrero St., South El Monte, Calif.)
Filed Dec. 5, 1960, Ser. No. 73,863
2 Claims. (Cl. 151—21)

My invention relates to mounting screw inserts and more particularly to a self-locking insert to be used in conjunction with injection and compression molded bodies.

Prior inserts utilizing a self-locking means have proved unsatisfactory when used with an injection type molding under high pressure. The wall thickness in self-locking inserts typically ranges from .012 inch for 2-56 threads to .020 inch for 10-32 threads. Such thin walls are easily deformed and are desirable for self-locking purposes. As the pressure employed in forming the molded body surrounding the insert is increased, the portion of the insert embodying the self-locking means is either distorted or wholly sealed in under pressure, thereby rendering common self-locking means inoperative.

It is an object of this invention to provide an insert having an effective self-locking means even when such insert is subjected to the high pressures of injection type molding. Another object of this invention is to provide a self-locking insert having means for securing same within a cast body.

A further object of this invention is to provide a self-locking insert which is light in weight and yet possesses great durability.

Another important object of this invention is to provide a self-locking insert including a means for securing the insert within a cast body and a pin-receiving stem adjacent the securing means and providing a means for locking a pin therewithin.

Still another object of this invention is to provide a self-locking insert including a means for securing the insert within a cast body, a pin-receiving stem adjacent the securing means and providing a means for locking a pin therewithin, and a protective means circumventing the pin-receiving stem and covering the pin-locking means.

A further object of this invention is to provide a self-locking insert including a knurled head provided as a means for securing the insert within a cast body, a pin-receiving stem adjacent the knurled head and providing a circumferential groove extending about the exterior thereof and having a pin-locking means located in such groove, and a collar circumventing the pin-receiving stem and covering the groove, such collar having an exterior knurled surface to aid in securing the insert within a cast body.

The foregoing objects, advantages, features, and results of the present invention, together with various other objects, advantages, features, and results thereof which will be evident to those skilled in the art to which the invention pertains, may be achieved with the exemplary embodiment described in detail hereinafter and illustrated in the accompanying drawing, in which:

FIG. 1 is a cross-sectional view of the invention;

FIG. 2 is a view similar to FIG. 1, shown partly in elevation, showing a pin placed within the insert; and FIG. 3 is a cross-sectional view of an alternative form of the invention.

Referring to the drawing, FIG. 2 exhibits the insert 10 of FIG. 1 secured within a cast body 12 of plastic or other molding material, the body 12 having been formed by an injection type molding process under relatively high pressure. The insert 10 provides a pin-receiving stem 14 including a cylindrical wall 16 having an opening 18 at one end and a knurled head 20 having a diameter greater than the exterior of the cylindrical wall 16 located at the other end thereof. The opening 18 is exposed exterior of the plastic body 12 and provides access to a partially threaded cylindrical chamber 21 defined by the cylindrical wall 16 and terminating within the body of the knurled head 20.

The pin-receiving stem 14 provides a circumferential groove 22 extending about the exterior of the cylindrical wall 16 and positioned intermediate the opening 18 and the knurled head 20. The groove 22 conforms to substantially a shallow U-shape in cross-section including a pair of opposing side walls 24 connected by a bottom surface 26. Carried on the pin-receiving stem 14 is a pin-locking means 28 including a conically shaped recess 29 located in the bottom surface 26 of the circumferential groove 22. The recess 29 is indented sufficiently to extend into the thread pattern within the cylindrical chamber 21.

Surrounding the pin-receiving stem 14 is a circular collar 30 having an inner diameter substantially commensurate with the outer diameter of the cylindrical wall 16, thereby enabling such collar to slidably fit thereover. The collar and wall preferably are a push fit so that the parts are easily assembled to a relatively fixed position. Further, the collar 30 has a width greater than the width of the grove 22 and therefore completely covers the groove 22 when positioned circumferentially of the pin-receiving stem 14. As a result, a space 32 is defined between the collar 30 and the bottom surface 26 of the groove 22. On the exterior of the collar 30 is a knurled surface 31 similar to the knurled head 20.

In actual operation, the circular collar 30 is slidably placed about the pin-receiving stem 14, thereby covering the groove 22, prior to the insert 10 being sealed within the body 12. The insert 10 is then ready to be sealed within the cast plastic body 12 and subjected to the relatively high pressures of any type molding. The collar 30 serves to protect the thin portion of the cylindrical wall 16 adjacent the bottom surface 26 of the groove 22 from the pressures of the molding process and it also serves to prevent the plastic, during the molding process, from filling the groove 22 and thereby wholly restricting any flexing of the thin wall or the conically shaped recess 29 when a pin 34 is threaded into the chamber 21.

After completion of the molding process, the insert 10 is ready for receiving the threaded pin 34 (see FIG. 2). The pin 34, in most instances, will be utilized to secure or fasten another body 36 to the plastic body 12 housing the insert 10. As the pin 34 is threaded into the cylindrical chamber 21 it engages the portion of the conically shaped recess 29 extending into the internal thread pattern of the wall 16. The cone defining the recess is then urged, by the incoming pin 34, into a more flattened position (see FIG. 2) with any distorted or warped portion thereof, due to the flexibility of the bottom surface 26, extending into the space 32. The locking effect of the conical recess 29 is achieved when the conical portion thereof which extends into the thread pattern of the chamber 21 becomes lodged between the threads carried on the pin 34 forming an interference fit therewith.

The knurled head 20 of the insert 10 is provided as a securing means for retaining the insert within the plastic body 12 and is preferably knurled to resist torsional and tension loads and provide engagement with the body. The molded plastic of the body 12 conforms to the irregular pattern of the knurled head 20 and collar 30, thereby restricting any movement of the insert 10.

FIG. 3 of the drawing exhibits an alternative embodiment of the invention which provides for maintaining an insert in a fixed position during casting. The insert 10, being secured within the cast plastic body 12, provides a pin-receiving stem 114 including a cylindrical wall 116 having an opening 118 at one end thereof. The opening 118 is exposed exterior of the body 12 and the cylindrical wall 116 passes through an aperture 119 in an outer metal body shield 120. The cylindrical wall 116 further provides a knurled head 122 located substantially adjacent the opening 118 and abutting the under side of the body shield 120.

The opening 118 provides access to a threaded cylindrical chamber 123 defined by the wall 116 and terminating at a solid end 124 of the pin-receiving stem 114. A circumferential groove 22, as previously described, extends about the exterior of the cylindrical wall 116 intermediate the solid end 124 and the knurled head 122. Located within the groove 22 is the previously described conically shaped recess 29. Surrounding the pin-receiving stem 114 and covering the groove 22 is the aforementioned circular collar 30.

In the alternative embodiment shown in FIG. 3, the cylindrical wall 116 is initially inserted within the aperture 119 of the metal body shield 120 and the knurled head 122 which abuts the shield is secured thereto as by spot welding 130 or the like. The circular collar 30 may then be slidably positioned over the pin-receiving stem 114 in order to cover the groove 22. After completion of the injection type molding process a pin 34 as shown in FIG. 2 may be placed within the insert 10 as previously described.

Although the insert 10 has been employed here in relation to a cast plastic body having been formed by injection type molding, the structure is equally applicable to any situation where an insert is used within a molded structure. Further, it will be understood that various modifications, minor changes, and substitutions may be incorporated in such embodiment without departing from the spirit of the invention as defined by the claims which follow.

I claim:
1. In a self-locking insert for molding in place in a molded body, the combination of:
  a head located within said molded body and having a knurled exterior surface for engagement with the body to prevent both rotational and axial movement thereof within said molded body;
  a pin-receiving stem formed integral with said knurled head and extending therefrom within said molded body and including a cylindrical wall having an open end and a closed end and defining a threaded chamber therewithin communicating with said open end, an annular groove extending circumferentially about the exterior of said cylindrical wall and defining a circumferential air space, and a conically shaped inwardly extending recess located in the bottom of said groove and indented a distance sufficient to deflect a portion of said wall into the thread pattern of said chamber; and
  a collar having a cylindrical inner wall and opposing open ends, said collar surrounding the cylindrical wall of said pin-receiving stem in a push-fit relationship and having a width greater than the width of said groove and sufficient to completely cover said groove so as to seal said circumferential air space from said molded body, and said collar having a knurled exterior surface for engagement with the body to prevent both rotational and axial movement thereof within said molded body.

2. A self-locking insert as defined in claim 1 in which said pin-receiving stem has a length greater than the width of said collar, and in which said collar is spaced from said head defining an annular locking space for the molded body between said head and collar.

References Cited in the file of this patent
UNITED STATES PATENTS

| | | |
|---|---|---|
| 2,090,337 | Stoll | Aug. 17, 1937 |
| 2,545,045 | Rosan | Mar. 13, 1951 |
| 2,728,370 | Neuschotz | Dec. 27, 1955 |
| 2,754,882 | Rosan | July 17, 1956 |
| 2,880,830 | Rohe | Apr. 7, 1959 |
| 3,019,865 | Rohe | Feb. 6, 1962 |